(12) United States Patent
Neubert et al.

(10) Patent No.: US 8,357,449 B2
(45) Date of Patent: Jan. 22, 2013

(54) MULTI-PLY SELF-ADHESIVE TAPE

(75) Inventors: Ingo Neubert, Norderstedt (DE); Bernd Lühmann, Norderstedt (DE)

(73) Assignee: tesa SE, Hamburg (DE)

( * ) Notice: Subject to any disclaimer, the term of this patent is extended or adjusted under 35 U.S.C. 154(b) by 281 days.

(21) Appl. No.: 12/515,788

(22) PCT Filed: Nov. 23, 2007

(86) PCT No.: PCT/EP2007/062747
§ 371 (c)(1),
(2), (4) Date: May 21, 2009

(87) PCT Pub. No.: WO2008/068150
PCT Pub. Date: Jun. 12, 2008

(65) Prior Publication Data
US 2010/0055435 A1    Mar. 4, 2010

(30) Foreign Application Priority Data
Dec. 6, 2006    (DE) .......................... 10 2006 057 800

(51) Int. Cl.
C09J 7/02 (2006.01)
C09J 7/00 (2006.01)
B32B 38/00 (2006.01)
B32B 37/14 (2006.01)

(52) U.S. Cl. .......... 428/220; 428/343; 428/339; 156/82; 156/272.6; 156/272.2

(58) Field of Classification Search .................. 428/220, 428/343, 339; 156/272.2, 272.6, 82
See application file for complete search history.

(56) References Cited

U.S. PATENT DOCUMENTS

| | | | |
|---|---|---|---|
| 2003/0113533 A1* | 6/2003 | Husemann et al. ........... | 428/343 |
| 2004/0137222 A1* | 7/2004 | Welke et al. .................. | 428/343 |
| 2006/0057366 A1 | 3/2006 | Husemann et al. | |
| 2006/0292365 A1* | 12/2006 | Iwama ...................... | 428/355 R |
| 2008/0118751 A1 | 5/2008 | Zoellner et al. | |
| 2008/0286569 A1 | 11/2008 | Husemann et al. | |
| 2009/0048398 A1 | 2/2009 | Zoellner et al. | |
| 2009/0053447 A1 | 2/2009 | Zoellner et al. | |

FOREIGN PATENT DOCUMENTS

| | | |
|---|---|---|
| DE | 20014891 U1 | 3/2001 |
| DE | 102005027350 A1 | 12/2006 |
| EP | 0980902 A | 2/2000 |
| WO | 2004050784 A1 | 6/2004 |
| WO | 2006000505 A | 1/2006 |
| WO | 2006027389 A1 | 3/2006 |

OTHER PUBLICATIONS

D. Satas, "Handbook of Pressure Sensitive Adhesive Technology", 3rd Edition (Sections 11, 12, 14 and 16).
Nentwig, "Kunststoff-Folien", Carl Hanser Verlage, 1994 (p. 159).
R. Quack, "Corona-Technologie", Coating, Mar. 2000 (p. 86).
F. Foerster, "Neue Entwicklung in Der Coronatechnologie", Flexoprint, Aug. 2002 (p. 25).
D. Satas, "Handbook of Pressure Sensitive Adhesive Technology", 3rd Edition (Section on "Acrylic Adhesives").

* cited by examiner

*Primary Examiner* — David Sample
*Assistant Examiner* — Tahseen N Khan
(74) *Attorney, Agent, or Firm* — Norris McLaughlin & Marcus, P.A.

(57) ABSTRACT

Self-adhesive tape comprising a laminate composed of at least two pressure-sensitive adhesive (PSA) layers A and B laminated directly to one another, one or both of the surfaces to be laminated to one another of the PSA layers A and B having been chemically and/or physically pretreated prior to lamination, and the shear strength $t^S_{A/B}$ of the self-adhesive tape at 25° C., 40° C. and 70° C. under a weight load of 1000 g being at least 80% of the shear strength $t^S_o$ of the PSA layer A and/or of the PSA layer B, where $t^S_o$ represents the shear strength of the PSA layer having the lower shear strength.

20 Claims, No Drawings

MULTI-PLY SELF-ADHESIVE TAPE

This is an application filed under 35 USC §371 of PCT/EP2007/062747, filed Nov. 23, 2007 and claiming priority to DE 10 2006 057 800.7 filed on Dec. 6, 2006.

BACKGROUND OF THE INVENTION

The present invention relates to a self-adhesive tape comprising pressure-sensitive adhesive layers laminated to one another.

Double-sidedly self-adhesive tapes are typically used for fixing and joining a wide variety of materials. The range of applications here is very diverse. Nowadays, for instance, a multiplicity of different self-adhesive tapes are used in the automotive industry, for example, for bonding door trim and decorative trim, and in the electronics industry, for example, for bonding displays, batteries or speakers in devices including mobile telephones, digital cameras or pocket computers. Through the use of pressure-sensitive adhesive tapes it is possible for the individual technical components to be mounted in a more space-saving way which is much quicker and hence more efficient and more advantageous in terms of cost.

For use in the automotive industry and electronics industry, the performance requirements imposed on the self-adhesive tapes are exacting. Important criteria here include a high bond strength, more particularly a high shear strength, high ageing resistance, and, not least, electronic compatibility. For these kinds of applications, therefore, self-adhesive tapes based on highly crosslinked polyacrylate adhesives are utilized primarily.

Selected applications impose particular requirements on thickness and thickness-tolerance on the part of the adhesive tapes. Thus, for example, for the bonding of display windows in mobile telephones, only self-adhesive tapes having a precisely selectable thickness and at the same time a very low thickness tolerance are suitable. The sum of the thickness of the display window and the thickness of the self-adhesive tape must fit exactly into the adhesive joint space left. A further example of a specific thickness requirement for self-adhesive tapes is in the manufacture of film keyboards. Here, self-adhesive tapes are typically used as spacers between the individual electrical functional layers. In this application, the use of adhesive tapes of 250 µm or even thicker is not uncommon. The applications necessitate a precisely defined thickness on the part of the self-adhesive tape. Setting the overall thickness of the self-adhesive tapes is typically done by adjusting the thickness of the carrier material—here, use is frequently made, for example, of polyester films—and/or by adjusting the thickness of the coating of adhesive. In the case of thick PET carrier films, the sharp increase in flexural rigidity that occurs as the thickness increases imposes restrictions on the maximum thickness that can be utilized. Typical commercial double-sided self-adhesive tape products therefore consist of a PET carrier film in a thickness, for example, of 9 to 175 µm, which is coated on both sides, for example, with 50 g/m² of an acrylate adhesive. Products with even thicker PET carrier films, with thicknesses exceeding 200 µm, are very difficult indeed to process to form roll product, owing to the high flexural rigidity.

The second option, that of adapting the product thickness by way of the thickness of the coating of adhesive, is likewise subject to technical limits. In the processing of pressure-sensitive adhesives (PSAs) based on aqueous dispersions, maximum PSA thicknesses of typically around 70 g/m² are achievable. Higher PSA thicknesses can be achieved if coating takes place from solvent. Subject to the proviso of a suitable drying technology, PSA thicknesses can be realised here of up to about 120 g/m². One example of this that may be mentioned is the product Tesafix® 4965, which is composed of a PET carrier film 12 µm thick coated on both sides with 100 g/m² per side of an acrylate adhesive. An even higher level of adhesive application is not realisable from an economic standpoint using the typical solvent processes, since bubble-free coating is impossible and/or drying is possible only with very slow operating speeds that are not feasible economically.

A further possibility for producing thick PSA coatings lies in the coating of PSA melts or of prepolymers which subsequently, in the as-coated state, are crosslinked. Disadvantages are the typically sharp limitation to the maximum molar mass that can be employed in the case of hotmelt PSAs, the often high residual levels of unreacted monomers, and oligomeric constituents when prepolymers are used.

A further possibility for the production of relatively thick PSA tapes is provided by the lamination of two or more pressure-sensitive adhesive (PSA) layers. This process operates very well in the case of non-crosslinked PSAs such as, for example, adhesives based on polyisobutylene, physically crosslinked PSAs, such as adhesives based on styrene block copolymers, for example, particularly when lamination here takes place at an elevated temperature, or PSAs with low levels of crosslinking, such as adhesives based on natural rubber with a low level of crosslinking, for example. The lamination of crosslinked acrylate PSA layers, in contrast, frequently leads to a laminate having a reduced profile of properties, owing to the low lamination strength or composite strength of the layers. It is thought that, owing to a high degree of crosslinking, the polymer chains of the acrylate PSA are incapable of forming loops of sufficient length at the interface. With certain products, this circumstance is utilized deliberately in order to offer a double-sided self-adhesive tape without release laminate release material (release paper or release film) in the form of roll product, so that two plies of the polyacrylate PSA layer come directly into permanent contact. Even after years of storage, these products can be unrolled without problems. Tesafix® 56661 is one example of such a product.

BRIEF SUMMARY OF THE INVENTION

It is an object of the present invention to provide a self-adhesive tape comprising two or more layers of pressure-sensitive adhesive which is distinguished by high composite strength on the part of the laminate. At the same time the profile of properties of the self-adhesive tape ought to deviate only slightly, if at all, from that of the corresponding PSA monolayer.

This object is achieved by means of a self-adhesive tape as specified in the main claim. The dependent claims provide advantageous developments of the subject matter of the invention.

The invention accordingly provides a self-adhesive tape comprising a laminate composed of at least two pressure-sensitive adhesive (PSA) layers A and B laminated directly to one another, one or both of the surfaces to be laminated to one another of the PSA layers A and B having been chemically and/or physically pretreated prior to lamination, and the shear strength $t^S_{A/B}$ of the self-adhesive tape at 25° C., 40° C. and 70° C. under a weight load of 1000 g being at least 80% of the shear strength $t^S_o$ of the PSA layer A and/or of the PSA layer B, where $t^S_o$ represents the shear strength of the PSA layer having the lower shear strength Where more than two PSA layers are to be laminated to one another, it is necessary in accordance with the invention to ensure that in each case at least one of the two surfaces to be laminated to one another of the PSA layers has been chemically and/or physically pretreated.

According to one preferred embodiment of the invention the shear strength of the self-adhesive tape at 25° C., 40° C. and 70° C. under a weight load of 1000 g is greater than 10 000 min.

In the present invention a laminate is produced from two or more adhesive layers, at least one of the two adhesive surfaces to be laminated being pretreated chemically and/or physically immediately prior to lamination. As a chemical pretreatment it is possible to use a polar or reactive coating, also known to the person skilled in the art as priming. Physical pretreatment methods employed are preferably those of flame, plasma or corona pretreatment. In one preferred version of the present invention at least one of the adhesive surfaces to be laminated is subjected to corona treatment immediately prior to the laminating operation.

The characteristic property of the self-adhesive tape of the invention is a particularly good composite strength on the part of the laminated adhesive layers.

This particularly good composite strength can be demonstrated by means for example of a shearing test. The results of shearing tests are typically heavily dependent on the nature of the adhesive and the test conditions. A very suitable test for demonstrating the composite strength of two adhesive layers, independently of the type of adhesive, is a shearing test along the lines of PSTC-7 (holding power). Composite strength can be assumed to be very good when, in accordance with equation (1)

$$P_{laminate}=100 * t^S_{A/B}/t^S_o \quad (1)$$

$P_{laminate}$—percentage ratio between the shear strength of a laminate and the shear strength of an adhesive layer used to form the laminate $t^S_{A/B}$—shear strength in minutes of a laminate composed of two adhesive layers A and B $t^S_o$—shear strength in minutes of the adhesive monolayer A or B, $P_{laminate}$ is greater than or equal to 80%. This means that the shear strength of the laminate $t^S_{A/B}$ and hence also of the interface is not less than 80% of the shear strength of the unlaminated $t^S_o$ adhesive (mono)layer. Deviations in the measurement of the shear strength through the different thicknesses of the unlaminated and laminated specimens are disregarded.

In the case of different adhesive layers A and B the value $t^S_o$ is measured and reported for the adhesive monolayer having the lower shear strength.

The equation is likewise applicable to laminates composed of more than two adhesive layers.

The shear strength of the self-adhesive tape of the invention can likewise be determined as a function of time by quantitatively monitoring the shear deformation (the parameter measured is the shearing path under weight load). A measurement method and an associated instrument are described in DE 200 14 891 U1. This document is referred to expressly, and is part of the present disclosure content. In this test the test specimen, as in the shearing test, is loaded with a weight parallel to the bonding or laminating face. In contrast to the shearing test corresponding to PSTC-7, the shear strength is not determined on the basis of a holding time; instead, the shear deformation after 15 minutes of shear loading, in µm, is measured. With this test the specimens are loaded with relatively high forces (weights) parallel to the bonding or laminating face. In the case of the so-called high-performance acrylate adhesives, the specimens are loaded, for example, with weights of 500 g for a bonding area of 5 cm².

In the same way as with the test results for the shear strength, delamination of the interface between the PSA layers is observed under these test conditions over the 15-minute measurement time, if the said layers have been laminated without any pretreatment. If, however, at least one of the interfaces is subjected to chemical or physical pretreatment immediately prior to lamination, no delamination is observed, and the shear deformation is in the region of the adhesive monolayer. If the shear deformation test is carried out with a weight which is too low, the test is not meaningful with regard to the composite strength of a laminated interface of two pressure-sensitive adhesives.

The distinct improvement in the composite strength of the PSA laminates of the invention is likewise confirmed through measurement of the peel strength (bonding force, peel), in accordance for example with PSTC-1.

In this test, laminates without pretreatment tend to undergo delamination. It is not possible to measure a bonding force on a test substrate such as steel, for example. However, if at least one of the two surfaces to be laminated is subjected to a chemical or physical pretreatment method, no delamination of the composite at the interface is observed during the bonding force measurement.

It is apparent—surprisingly so for the person skilled in the art—that a chemical or physical pretreatment, and more specifically a corona pretreatment, of at least one of the two adhesive surfaces, immediately prior to lamination, produces a considerable increase in the composite strength of the interface of the laminate, or of the anchoring between two laminate layers. This effect is observed, surprisingly, even in the case of highly crosslinked straight-acrylate adhesives. The highly crosslinked straight-acrylate adhesives, also referred to by the skilled person as high-performance acrylate adhesives, are distinguished by a very high level of cohesion (shear strength). Where two straight-acrylate adhesive layers are laminated, a drastic deterioration is observed in the shear strength ($P_{laminate}$<10%) owing to the poor composite strength of the adhesive layers. In the shearing test and in the shear deformation test there is typically always failure at the interface between the adhesive layers. As a result of the preferred corona pretreatment of the adhesive surface immediately prior to lamination it is observed, surprisingly and in a manner unforeseeable for the person skilled in the art, that the shear strengths and hence composite strengths of these laminates are just as good as those of the pure adhesive monolayers.

Various methods of surface pretreatment of polymer films, metal surfaces or wooden surfaces for the purpose of enhancing the adhesion of paints and varnishes are known from the literature ("Polymer Surface" F. Garbassi et al, John Wiley, 1998, and "Kunststoff-Folien", Nentwig, Carl Hanser Verlag, 1994, pages 159 ff). In practice the surface of polymeric carrier films based, for example, on polyesters or on polyolefins such as polypropylene or polyethylene, for example, is activated by chemical treatment, by coating or by physical methods in such a way that, for example, printing inks, varnishes or else adhesives are anchored more effectively on the film surface. The enhanced anchorage observed derives from improved wetting behavior and/or from an increase in the physical interactions (for example dipole-dipole interactions, van-der-Waals interactions, hydrogen bonds) and/or from the production of chemical bonds. In the case of chemical pretreatment the film surfaces are etched, for example, with strong oxidizing acids such as trichloroacetic acid or chromosulphuric acid, and by that means functional groups are generated on the film surface.

Known coatings for enhancing the adhesion—known to the skilled person as primers—are dispersion-based and solvent-based systems, based for example on isoprene-containing or butadiene-containing rubber, cyclorubber, polyvinyl chloride and/or polyvinylidene chloride homopolymers or copolymers. Primers of this kind may likewise include reactive additives such as isocyanates or epoxy resins. Descriptions of typical primers are found for example in the "Handbook of Pressure Sensitive Adhesive Technology", D. Satas (3rd edition).

Polymer film surface treatment methods widespread in the art are physical methods such as flame, plasma and corona treatment. These methods likewise generate functional groups on the surface of the polymer film. In the case of flame and corona treatment, the treatment is a surface oxidation which results in an increase in the polarity and hence in the surface energy (surface tension) and, consequently, in the wettability and anchoring of printing inks, varnishes and adhesives. The functional groups obtained may increase the adhesion of the coating on the polymer film through increased dipole-dipole interaction, through hydrogen bonds and/or through chemical reaction at the interface. Also discussed in the literature is the generation of reactive groups such as free radicals on the polymer surface (R. Quack, "Corona-Technologie", Coating, March 2000, page 86; F. Förster et al, "Neue Entwicklung in der Coronatechnologie", Flexoprint, August 2002, page 25).

Surprisingly and in a way which was not foreseeable for the person skilled in the art, the chemical and physical pretreatment methods, and more particularly the corona treatment, raise the composite strength of two adhesive layers laminated to one another. This effect is particularly surprising in the context of highly crosslinked straight-acrylate adhesives, the so-called high-performance acrylate PSAs.

The phenomenon of an improvement in composite bond strength, i.e. in the adhesion of the boundary layers of two or more PSA layers laminated to one another, as a result of chemical or physical pretreatment of at least one of the PSA surfaces to be laminated is observed, surprisingly, for all known adhesives. It is immaterial whether the adhesives are coated from the melt (hotmelt), from solution in an organic solvent, or in the form of their aqueous dispersion. The chemical basis of the polymers of which the PSAs for lamination are composed may be formed, for example, by natural rubber, polyacrylates, silicones, synthetic rubbers such as polyisoprene, polybutadiene, polybutene, polyisobutylene, styrene block copolymers, ethylene-vinyl acetate or else polyurethane, to give but at a few typical examples. It is possible to use the aforementioned materials in their pure form (as pure substances), in combination with one another or in a blend with typical additives such as tackifier resins, plasticizers, fillers, dyes, pigments or ageing inhibitors, as the pressure-sensitive adhesive. The above enumeration of polymers and additives for preparing PSAs which can be utilized in accordance with the invention should not be considered as conclusive; instead, there are indeed other polymers and additives that are known to the skilled person and that may likewise be employed in the invention. An exhaustive description of a very wide variety of kinds of pressure-sensitive adhesives and of their composition can be found, for example, in the "Handbook of Pressure Sensitive Adhesive Technology", D. Satas (section on "Acrylic Adhesives" and also sections 11, 12, 13, 14 and 18 (3rd edition)).

The two or more adhesive layers laminated to one another preferably comprise adhesives identical in composition. In the case of more than two adhesive layers laminated to one another, furthermore, preferably all of the layers have an identical composition. The use and lamination of different adhesives, however, is not excluded from the concept of the invention. In accordance with another advantageous version of the invention, therefore, when there are more than two adhesive layers laminated to one another, at least two layers have a different composition.

A preferred subject of the present invention is a self-adhesive tape composed of a laminate of two or more straight-acrylate PSA layers identical in composition.

The PSAs are preferably composed of one or more copolymers in which acrylate/acrylic monomer units form the principal constituent, and/or are crosslinked. In order to generate sufficient cohesion, the polymers are preferably crosslinked. The PSAs further comprise, in accordance with a further preferred embodiment, no additions at all of tackifier resins or plasticizers.

A preferred subject of the present invention is a self-adhesive tape composed of a laminate of two or more straight-acrylate PSA layers identical in composition.

In a further preferred version, the pressure-sensitive adhesive layers of the self-adhesive tape of the invention are composed of one or more copolymers of at least the following monomers:

c1) 70% to 100% by weight of acrylic esters and/or methacrylic esters and/or their free acids, with the following formula

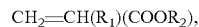

$CH_2=CH(R_1)(COOR_2)$, where $R_1$=H and/or $CH_3$ and $R_2$=H and/or alkyl chains having 1 to 30 C atoms and being linear, branched and/or containing cyclic structural elements, c2) 0% to 30% by weight of further olefinically unsaturated monomers, more particularly those containing specific functional groups or those which serve, for example, to set the glass transition temperature or other physical and/or chemical properties of the polymers.

One very preferred embodiment uses, as monomers c1), acrylic monomers which comprise acrylic and methacrylic esters with alkyl groups consisting of 4 to 14 C atoms, preferably 4 to 9 C atoms.

Specific examples, without wishing this enumeration to impose any restriction, are:

n-butyl acrylate, n-pentyl acrylate, n-hexyl acrylate, n-heptyl acrylate, n-octyl acrylate, n-nonyl acrylate, lauryl acrylate, stearyl acrylate, behenyl acrylate, and their branched isomers such as, for example, tert-butyl acrylate and 2-ethylhexyl acrylate.

Further classes of compound, which may likewise be added in small amounts of less than 10% by weight under c1) are:

methyl methacrylate, cyclohexyl methacrylate, isobornyl acrylate and isobornyl methacrylate.

One very preferred embodiment uses, for the monomers c2), vinyl esters, vinyl ethers, vinyl halides, vinylidene halides, vinyl compounds with aromatic ring systems and heterocycles in α position. Here too a number of examples may be given, without the enumeration being regarded as conclusive:

vinyl acetate, vinylformamide, vinylpyridine, ethyl vinyl ether, vinyl chloride, vinylidene chloride and acrylonitrile.

A further very preferred embodiment uses, for the monomers c2), monomers containing the following functional groups:
hydroxyl, carboxyl, epoxy, acid amide, isocyanato or amino groups.

One advantageous variant uses, for c2), acrylic monomers corresponding to the general formula:

$$CH_2=CH(R_1)(COOR_3),$$

where $R_1=H$ or $CH_3$ and the radical $R_3$ represents or includes a functional group which assists subsequent UV crosslinking of the pressure-sensitive adhesive, and which possesses, for example, in one particularly preferred embodiment, a H donor effect.

The above-described particularly preferred straight-acrylate adhesives preferably likewise comprise no tackifier resins or plasticizers.

Additives such as fillers (for example fibres, carbon black, zinc oxide, titanium dioxide, chalk, solid or hollow glass beads, microbeads of other materials, glass fibres, silica, silicates, nanoparticles), compounding assistants and/or ageing inhibitors, in the form for example of primary and secondary antioxidants or in the form of light stabilizers, may, however, be added to the pressure-sensitive adhesive.

To summarize, the preferred embodiment of the self-adhesive tape of the invention is composed of one or more polyacrylate PSA layers whose surface at least on one side is subjected, immediately prior to lamination, to a chemical or physical pretreatment process, more particularly corona pretreatment, the individual polyacrylate PSA layers having been produced by coextrusion, melt coating, solution coating or dispersion coating. Particular preference is given to comma bar coating of the polyacrylate PSA from a suitable solvent or solvent mixture.

The PSAs consisting of polyacrylate copolymers without addition of tackifier resins and/or plasticizers, which are particularly preferred for the self-adhesive tape of the invention, are distinguished by a particularly good level of cohesion. The very high level of cohesion of such PSA monolayers is reflected in high holding powers at 25° C., 40° C. and 70° C. under weight loads of 1 kg, of greater than 10000 min, and in a shear deformation of less than 100 µm at 40° C. under a weight load of 500 g.

According to one preferred embodiment of the invention, other than the laminate, the self-adhesive tape contains no further layer of a carrier material. In this case the adhesive tape is what is called a transfer tape.

However, the adhesive layers for lamination may be joined to a carrier film, so producing a self-adhesive tape composed of the laminate plus at least one carrier material. In this case, however, a first PSA layer is of course laminated directly to a second PSA layer. Besides the laminate, the self-adhesive tape may indeed have one or more layers of a carrier material or of different carrier materials.

Carrier materials used for the self-adhesive tape are the carrier materials that are typical and familiar to the person skilled in the art, such as films of polyester, polyethylene, polypropylene, oriented polypropylene, polyvinyl chloride, more preferably films of polyethylene terephthalate (PET). This enumeration is not to be understood as being conclusive. In the context of the invention, the use of other films with a polymer base not referred to above is possible.

When a carrier film is used it is advantageous to utilize a primer layer or coextrusion layers between carrier film and pressure-sensitive adhesive, more particularly polyacrylate PSA, or a physical surface treatment such as flame, corona or plasma of the carrier film, in order to improve the adhesion of the adhesive to the carrier film.

The overall thickness of the self-adhesive tape, without release film, is preferably at least 100 µm.

There are no restrictions imposed on the thickness of the individual PSA layers for lamination. In one preferred version, the thickness of the individual PSA layers is 5 to 120 µm, and with particular preference 40 to 100 µm.

Test Methods

Peel Strength (Bonding Force)

The peel strength (bonding force) is tested along the lines of PSTC-1. A strip of the self-adhesive tape, 2 cm wide, is adhered to a polished steel plate as the test substrate, by passing a 5 kg roller back and forth over the adhered strip five times. Double-sided adhesive tapes are reinforced on the reverse with an unplasticized PVC film 36 µm thick. The plate is clamped in, the self-adhesive strip is peeled via its free end in a tensile testing machine under a peel angle of 180° and at a speed of 300 mm/min, and the force required to accomplish this is recorded. The results are reported in N/cm and are averaged over three measurements. All of the measurements are carried out in a controlled-climate room at 23° C. and 50% relative humidity.

Shear Strength

Testing takes place along the lines of PSTC-7. A strip of the self-adhesive tape, 1.3 cm wide, is adhered to a polished steel plaque over a length of 2 cm, by passing a 2 kg roller back and forth over the adhered strip twice. The plaques are equilibrated under test conditions, but without loading, for 30 minutes (temperature of 25° C., 40° C. or 70° C. and atmospheric humidity of 50% relative humidity). The test weight is then hung on, thereby producing a shearing stress parallel to the bond area, and a measurement is made of the time taken for the bond to fail. If the holding time reaches 10 000 min, the experiment is terminated before the adhesive bond fails.

Quantitative Determination of Shear Deformation

A strip of a self-adhesive tape, 1 cm wide, is adhered to a polished steel plaque (test substrate) over a length of 5 cm, by passing a 2 kg roller back and forth over the adhered strip three times. Double-sided adhesive tapes are lined on the reverse with an aluminium foil 50 µm thick. The test strip is reinforced with a PET film 190 µm thick and then cut off with a straight edge using a fixing apparatus. The edge of the reinforced test strip projects 1 mm over the edge of the steel plaque. The plaques are equilibrated under test conditions (40° C., 50% relative humidity) but without loading for 15 minutes in the measurement apparatus. Subsequently the test weight of 500 g is hung on, so producing a shearing stress parallel to the bond area. A force transducer with a resolution in the µm range is used to plot the shearing path as a function of time, in the form of a graph. The shearing path (shear travel) after weight loading for 15 minutes is reported as the microshear travel µS1.

The invention will be elucidated in more detail below, with reference to a number of examples, without thereby wishing to subject the invention to any unnecessary restriction.

EXAMPLES

Example 1

A reactor conventional for a free-radical polymerization was charged with 80 g of acrylic acid, 450 g of n-butyl acrylate, 30 g of tert-butyl acrylate and 600 g of acetone. After nitrogen gas had been passed through the reactor for 45 minutes with stirring, the reactor was heated to 58° C. and 0.2 g of azobisisobutyronitrile (AIBN, Vazo 64®, DuPont) was added. Then the external heating bath was heated to 75° C., and the reaction was carried out constantly at this external temperature. After a reaction time of 1 h a further 0.2 g of AIBN was added. After 3 h and after 6 h, the mixture was diluted with 100 g each time of acetone/isopropanol (97:3). For reduction of the residual initiators, 1 kg portions of bis (4-tert-butylcyclohexanyl) peroxydicarbonate (Perkadox 16®, Akzo Nobel) were added after 8 h and after 10 h. The reaction was discontinued after a time of 22 h and the batch was cooled to room temperature.

Following the polymerization, the polymer was diluted with isopropanol to a solids content of 25% and then blended with 0.3% by weight of polyisocyanate (Desmodur N 75, Bayer), with stirring. Subsequently the polymer solution was coated using a comma bar onto a silicone-coated release paper. Drying was carried out at 120° C. for 10 minutes. The application coat weight was 50 g/m$^2$. After the coating step, the surface of the adhesive was pretreated in a Vetaphone Corona-Plus tape TF-415 laboratory corona unit, with a dose of 50 W min/m$^2$.

Immediately after this pretreatment, a second, unpretreated adhesive layer of the same composition and thickness was laminated to the pretreated adhesive layer. Lamination took place at room temperature using a manual roller.

Example 2

A reactor conventional for a free-radical polymerization was charged with 28 g of acrylic acid, 290 g of 2-ethylhexyl acrylate, 40 g of methyl acrylate and 300 g of acetone/isopropanol (97:3). After nitrogen gas had been passed through the reactor for 45 minutes with stirring, the reactor was heated to 58° C. and 0.2 g of azobisisobutyronitrile (AIBN, Vazo 64®, DuPont) was added. Then the external heating bath was heated to 75° C., and the reaction was carried out constantly at this external temperature. After a reaction time of 1 h a further 0.2 g of AIBN was added. After 3 h and after 6 h, the mixture was diluted with 150 g each time of acetone/isopropanol (97:3). For reduction of the residual initiators, 0.4 g portions of bis(4-tert-butylcyclohexanyl) peroxydicarbonate (Perkadox 16®, Akzo Nobel) were added after 8 h and after 10 h. The reaction was discontinued after a time of 22 h and the batch was cooled to room temperature.

Following the polymerization, the polymer was diluted with isopropanol to a solids content of 25% and then blended with 0.4% by weight of aluminium(III) acetylacetonate, with stirring. Subsequently the polymer solution was coated using a comma bar onto a silicone-coated release paper. Drying was carried out at 120° C. for 10 minutes. The application coat weight was 50 g/m$^2$. After the coating step, the surface of the adhesive was pretreated in a Vetaphone Corona-Plus tape TF-415 laboratory corona unit, with a dose of 50 W min/m$^2$.

Immediately after this pretreatment, a second, unpretreated adhesive layer of the same composition and thickness was laminated to the pretreated adhesive layer. Lamination took place at room temperature using a manual roller.

Example 3

For Example 3, two adhesive layers were laminated to one another as described in Example 2. In this case, however, both adhesive surfaces were pretreated with a corona dose of 50 W min/m$^2$ immediately prior to lamination. Lamination took place at room temperature using a manual roller.

Example 4

A reactor conventional for a free-radical polymerization was charged with 8 kg of acrylic acid, 48 kg of NTBAM, 8 kg of maleic anhydride, 368 kg of 2-ethylhexyl acrylate, 368 kg of n-butyl acrylate and 600 kg of acetone/isopropanol (97:3). After nitrogen gas had been passed through the reactor for 45 minutes with stirring, the reactor was heated to 58° C. and 400 g of Vazo 67®, (DuPont) were added. Then the external heating bath was heated to 75° C., and the reaction was carried out constantly at this external temperature. After a reaction time of 1 h a further 400 g of Vazo 67® (DuPont) were added. The reaction was discontinued after a time of 48 h and the batch was cooled to room temperature. Then 200 kg of Norsolene M1080® resin (Cray Valley), 100 kg of Foral 85 resin (Eastman), 11 kg/h of PETIA (UCB) and 1000 kg of special boiling-point spirit were added to the solution and dissolved therein.

Subsequently the polymer solution was coated using a comma bar onto a silicone-coated release paper. Drying was carried out at 120° C. for 10 minutes. The application coat weight was 50 g/m$^2$. After the coating step, the surface of the adhesive was pretreated in the laboratory in a Vetaphone Corona-Plus tape TF-415 laboratory corona unit, with a dose of 50 W min/m$^2$.

Immediately after this pretreatment, a second, unpretreated adhesive layer of the same composition and thickness was laminated to the pretreated adhesive layer. Lamination took place at room temperature using a manual roller.

Example 5

For Example 5, five adhesive layers were laminated to one another as described in Example 2. In this case, one adhesive surface in each case is pretreated with a corona dose of 50 W min/m$^2$ immediately prior to lamination. Lamination took place at room temperature using a manual roller.

|  | Example 1 | Example 2 | Example 3 | Example 4 | Example 5 |
|---|---|---|---|---|---|
| Pressure-sensitive adhesive | Straight acrylate | Straight acrylate | Straight acrylate | Acrylate resin modified | Straight acrylate |
| Adhesive coat weight [g/m$^2$] | 2 × 50 | 2 × 50 | 2 × 50 | 2 × 50 | 5 × 50 |
| Surface pretreatment prior to lamination | Corona treatment, one side 50 W min/m$^2$ | Corona treatment, one side 50 W min/m$^2$ | Corona treatment, two side 2 × 50 W min/m$^2$ | Corona treatment, one side 50 W min/m$^2$ | Corona treatment one side in each case 50 W min/m$^2$ |

-continued

|  | Example 1 | Example 2 | Example 3 | Example 4 | Example 5 |
|---|---|---|---|---|---|
| Laminating conditions | 25° C. Lamination by hand | 25° C. Lamination by hand | 25° C. Lamination by hand | 25° C. Lamination by hand | 25° C. Lamination by hand |
| Bonding force on steel [N/cm] | 6.2 | 5.9 | 6.0 | 10.5 | 9.2 |
| Shear deformation 500 g, 40° C. [μm] | 53 | 63 | 69 | 230 (200 g) | 91 |
| Shear strength at 25° C., 10N [min] | >10000 | >10000 | >10000 | 2350 | >10000 |
| Shear strength at 40° C., 10N [min] | >10000 | >10000 | >10000 | 701 | >10000 |
| Shear strength at 70° C., 10N [min] | >10000 | >10000 | >10000 | 71 | >10000 |
| Shear strength of monolayer $t^S_o$ at 25° C./40° C./70° C. [min] | in each case >10000 | in each case >10000 | in each case >10000 | 2840/781/83 | in each case >10000 |
| $P_{laminate} = 100 * t^S_{A/B}/t^S_o$ 25° C./40° C./70° C. [%] | ~100 | ~100 | ~100 | 83/89/86 | ~100 |

COUNTEREXAMPLES

Counterexample 1

For Counterexample 1, two adhesive layers were laminated to one another as described in Example 2. The adhesive surface was not pretreated prior to lamination. Lamination took place at room temperature using a manual roller.

Counterexample 2

For Counterexample 2, two adhesive layers were laminated to one another as described in Example 4. The adhesive surface was not pretreated prior to lamination. Lamination took place at room temperature using a manual roller.

Counterexample 3

For Counterexample 3 the adhesive coating of Example 2 was coated again with the adhesive solution from Example 2. Drying took place at 120° C. for 10 minutes. The coat weight in the tandem coating process was 100 g/m².

In the course of the drying operation, increased formation of bubbles was observed.

Counterexample 4

For Counterexample 4, two adhesive layers were laminated to one another as described in Example 2. The adhesive surface was not pretreated prior to lamination. Lamination took place at 100° C. using a roll laminator.

|  | Counterexample 1 | Counterexample 2 | Counterexample 3 | Counterexample 4 |
|---|---|---|---|---|
| Pressure-sensitive adhesive | Straight acrylate | Acrylate resin-modified | Straight acrylate | Straight acrylate |
| Adhesive coat weight [g/m²] | 2 × 50 | 2 × 50 | 2 × 50 | 2 × 50 |
| Laminating conditions | 25° C. Lamination by hand | 25° C. Lamination by hand | 25° C. Lamination by hand | 100° C. Roll laminator |
| Surface pretreatment prior to lamination | no pretreatment | no pretreatment | tandem coating, no pretreatment | no pretreatment |
| Bonding force on steel [N/cm] | 2.6 Delamination | 7.3 Delamination | 4.8 Delamination | 4.2 Delamination |
| Shear deformation 500 g, 40° C. [μm] | Delamination | Delamination | Delamination | Delamination |
| Shear strength at 25° C., 10N [min] | 750 | 310 | 890 | 770 |
| Shear strength at 40° C., 10N [min] | 260 | 120 | 610 | 220 |
| Shear strength at 70° C., 10N [min] | 80 | 23 | 260 | 110 |
| Shear strength of monolayer $t^S_o$ at 25° C./40° C./70° C. [min] | in each case >10000 | 2840/781/83 | in each case >10000 | in each case >10000 |
| $P_{laminate} = 100 * t^S_{A/B}/t^S_o$ 25° C./40° C./70° C. [%] | <8/3/0.8 | <11/15/28 | <9/6/3 | <8/2/1 |

The invention claimed is:

1. A self-adhesive tape comprising
a laminate including at least a first pressure-sensitive adhesive (PSA) layers A and
a second pressure-sensitive adhesive (PSA) layer B,
each layer having a lamination surface and wherein layer A and layer B are directly laminated to one another at their respective lamination surfaces, and wherein at least one of the lamination surfaces has been chemically and/or physically pretreated prior to lamination, wherein the shear strength $t^s_{A/B}$ of the self-adhesive tape at 25° C., 40° C. and 70° C. under a weight load of 1000 g being at least 80% of the shear strength $t^s_o$ of the PSA layer A and/or of the PSA layer B, where $t^s_o$ represents the shear strength of the PSA layer having the lower shear strength, and
wherein the at least first and second pressure-sensitive adhesives are composed of a copolymer of at least
a first monomer having 70% to 100% by weight of acrylic esters and/or methacrylic esters and/or their free acids, with the following formula $CH_2$=CH ($R_1$)($COOR_2$), where $R_1$=H and/or $CH_3$ and $R_2$=H and/or alkyl chains having 1 to 30 C atoms and being linear, branched and/or containing cyclic structural elements,
and
a second monomer having 0% to 30% by weight of olefinically unsaturated monomers.

2. The self-adhesive tape according to claim 1, wherein the shear strength of the elf-adhesive tape at 25° C., 40° C. and 70° C. under a weight load of 1000 g is greater than 10 000 min.

3. The self-adhesive tape according to claim 1, wherein the laminate contains a layer of a carrier material.

4. The self-adhesive tape according to claim 1, wherein at least one of the lamination surfaces is subjected to corona treatment immediately prior to the laminating operation.

5. The self-adhesive tape according to claim 1, wherein the at least two adhesive layers have an identical composition.

6. The self-adhesive tape according to claim 1, wherein the at least first and second pressure-sensitive adhesive layers have a different composition.

7. The self-adhesive tape according to claim 1, wherein the at least first and second pressure-sensitive adhesive layers are void of tackifier resins or plasticizers.

8. The self-adhesive tape according to claim 1, wherein the at least first and second pressure-sensitive adhesive layers are composed of one or more copolymers in which acrylate monomers form the principal constituent.

9. The self-adhesive tape according to claim 1, wherein the olefinically unsaturated monomers are containing specific functional groups or serve to set the glass transition temperature or other physical and/or chemical properties of the polymers.

10. The self-adhesive tape according to claim 9, wherein the second monomer is a acrylic monomer which comprises acrylic and methacrylic esters with alkyl groups comprising 4 to 9 C atoms.

11. The self-adhesive tape according to claim 1, wherein the total thickness of the self-adhesive tape is at least 100 μm.

12. The self-adhesive tape according to claim 11, wherein the thickness of the individual PSA layers is 40 to 100 μm.

13. The self-adhesive tape according to claim 1, wherein the pretreatment is a flame or plasma pretreatment.

14. The self-adhesive tape according to claim 13, wherein the pretreatment takes place by corona pretreatment.

15. The self-adhesive tape according to claim 13, wherein the pretreatment takes place by polar or reactive coating.

16. The self-adhesive tape according to claim 1, wherein the at least first and second pressure-sensitive adhesive layers are composed of one or more copolymers in which acrylate monomers form the principal constituent.

17. The self-adhesive tape according to claim 16, wherein the one or more copolymers are crosslinked.

18. The self-adhesive tape according to claim 1, wherein the first monomer uses acrylic monomers which comprise acrylic and methacrylic esters with alkyl groups comprising of 4 to 14 C atoms.

19. The self-adhesive tape according to claim 18, wherein the second monomer uses vinyl esters, vinyl ethers, vinyl halides, vinylidene halides, vinyl compounds with aromatic ring systems and heterocycles in α-position.

20. The self-adhesive tape according to claim 18, wherein the first monomer is made of acrylic monomers which comprise acrylic and methacrylic esters with alkyl groups comprising 4 to 9 atoms.

* * * * *